US011253747B2

(12) United States Patent
Patil et al.

(10) Patent No.: US 11,253,747 B2
(45) Date of Patent: Feb. 22, 2022

(54) AUTOMATED ACTIVITY DETECTION AND TRACKING

(71) Applicant: BOSE CORPORATION, Framingham, MA (US)

(72) Inventors: Naganagouda Patil, Westborough, MA (US); Mark Sydorenko, Wellesley, MA (US); John Gordon, Lexington, MA (US); Bruce C. Levens, Wayland, MA (US); Ryan K. Burns, Cambridge, MA (US); Jeremy Kemmerer, Holliston, MA (US); Juan Carlos Rodero Sales, Boston, MA (US); William Berardi, Grafton, MA (US)

(73) Assignee: BOSE CORPORATION, Framingham, MA (US)

( * ) Notice: Subject to any disclaimer, the term of this patent is extended or adjusted under 35 U.S.C. 154(b) by 412 days.

(21) Appl. No.: 16/295,511

(22) Filed: Mar. 7, 2019

(65) Prior Publication Data
US 2020/0282261 A1 Sep. 10, 2020

(51) Int. Cl.
*A63B 24/00* (2006.01)
*G06F 3/01* (2006.01)

(52) U.S. Cl.
CPC ...... *A63B 24/0003* (2013.01); *A63B 24/0062* (2013.01); *G06F 3/011* (2013.01); *G06F 3/017* (2013.01); *A63B 2024/0071* (2013.01)

(58) Field of Classification Search
CPC . A63B 24/0062; A63B 24/0003; G06F 3/017; G06F 3/011

USPC .......................................................... 702/141
See application file for complete search history.

(56) References Cited

U.S. PATENT DOCUMENTS

| 10,277,973 | B2 | 4/2019 | Perry et al. | |
|---|---|---|---|---|
| 2013/0332286 | A1* | 12/2013 | Medelius | G06Q 30/0269 705/14.66 |
| 2014/0070957 | A1* | 3/2014 | Longinotti-Buitoni | G06F 3/011 340/870.01 |
| 2014/0297218 | A1* | 10/2014 | Yuen | A63B 24/00 702/141 |
| 2015/0253120 | A1* | 9/2015 | Meschter | G16H 40/67 702/166 |
| 2018/0116528 | A1* | 5/2018 | Tzvieli | A61B 5/163 |

OTHER PUBLICATIONS

Ignor Pernek et al., Exercise repetition detection for resistance training based on smartphones, 2013, Per Ubiquit comput, 771-782 (Year: 2013).*

* cited by examiner

*Primary Examiner* — Aditya S Bhat
(74) *Attorney, Agent, or Firm* — Patterson + Sheridan, LLP

(57) ABSTRACT

A method is provided for detecting at least one fitness related activity is provided. Data is obtained from at least one sensor of a wearable device, wherein the at least one sensor detects the data based on at least one body movement of a user wearing the wearable device. Based on the obtained data, the at least one fitness related activity is detected from a set of fitness related activities, wherein the detection is performed without pre-training by the user for the detecting.

22 Claims, 6 Drawing Sheets

AUTOMATED ACTIVITY DETECTION AND TRACKING

FIELD

Aspects of the disclosure generally relate to automated activity tracking, and more specifically to techniques for automatically detecting and tracking fitness related activities.

BACKGROUND

Activity trackers, also known as fitness trackers, are devices that track fitness related metrics, such as distance walked or run, calorie consumption, and in some cases, heartbeat and quality of sleep. The term activity tracker is often used in the context of and interchangeably with smart watches that are synced, in many cases wirelessly, to a computer or smartphone for long-term data tracking. Over the years, activity trackers have developed from primitive smart watches capable of telling wearers the time and how many steps they have taken, to highly advanced activity trackers with heart rate monitors, calorie counters and the ability to detect different types of sporting activities ranging from running and spinning to playing cricket or lifting weights.

SUMMARY

All examples and features mentioned herein can be combined in any technically possible manner.

Aspects of the present disclosure provide a method for detecting at least one fitness related activity. The method generally includes obtaining data from at least one sensor of a wearable device, wherein the at least one sensor detects the data based on at least one body movement of a user wearing the wearable device; and detecting, based on the data, the at least one fitness related activity from a set of fitness related activities, wherein the detection is performed without pre-training by the user for the detecting.

In an aspect, the method further includes determining, based on the data, at least one characteristic related to the detected at least one activity.

In an aspect, the at least one characteristic comprises a number of repetitions of the detected at least one activity over a given time period.

In an aspect, the at least one characteristic comprises at least one of a duration of the at least one body movement related to the at least one activity, an extent of the at least one body movement related to the at least one activity, or intensity of performing the at least one activity.

In an aspect, the method further includes obtaining a selection by the user of the at least one activity from the set, wherein the detecting comprises attempting to detect, based on the data, the selected at least one activity.

In an aspect, the method further includes obtaining a desired number of repetitions of the selected at least one activity; determining, upon detecting the selected at least one activity, a number of repetitions related to the selected at least one activity in a given time period; and generating an indication when the number of repetitions is same as the desired number of repetitions.

In an aspect, the method further includes determining, based on the data, at least one pattern of the at least one body movement by the user associated with the detected at least one activity; and adjusting sensitivity of the at least one sensor based on the determined pattern.

In an aspect, the detection includes obtaining a threshold value of at least one parameter included in the data; and deciding that the at least one activity is detected when the at least one parameter equals or exceeds the threshold value.

In an aspect, the detection includes in a first stage, detecting the at least one activity based on data machine learning based activity detection algorithm; and in a second stage, detecting a number or repetitions of the detected at least one activity based on a template specific to the detected activity using dynamic time warping.

In an aspect, the method further includes obtaining additional data from at least another sensor of at least another wearable device worn by the user, wherein the detecting is further based on the additional data.

In an aspect, the set of fitness related activities comprises at least one of squats, lunges, jumping jacks, jumping rope, push-ups, lateral jumps, squat jumps, step-ups, around the world plank, or skips.

In an aspect, the method further includes determining, based on the data, an accuracy of performing the detected at least one fitness related activity including at least one of a form, speed, intensity or consistency related to the performed at least one fitness related activity.

A computer-readable medium for detecting at least one fitness related activity is provided. The computer-readable medium generally stores instructions which when processed by at least one processor performs a method including obtaining data from at least one sensor of a wearable device, wherein the at least one sensor detects the data based on at least one body movement of a user wearing the wearable device; and detecting, based on the data, the at least one fitness related activity from a set of fitness related activities, wherein the detection is performed without pre-training by the user for the detecting.

In an aspect, the computer-readable medium further includes instructions for determining, based on the data, at least one characteristic related to the detected at least one activity.

In an aspect, the at least one characteristic comprises a number of repetitions of the detected at least one activity over a given time period.

In an aspect, the computer-readable medium further includes instructions for obtaining a selection by the user of the at least one activity from the set, wherein the detecting comprises attempting to detect, based on the data, the selected at least one activity.

In an aspect, the computer-readable medium further includes instructions for obtaining a desired number of repetitions of the selected at least one activity; determining, upon detecting the selected at least one activity, a number of repetitions related to the selected at least one activity in a given time period; and generating an indication when the number of repetitions is same as the desired number of repetitions.

In an aspect, the computer-readable medium further includes instructions for determining, based on the data, at least one pattern of the at least one body movement by the user associated with the detected at least one activity; and adjusting sensitivity of the at least one sensor based on the determined pattern.

In an aspect, the detecting includes obtaining a threshold value of at least one parameter included in the data; and deciding that the at least one activity is detected when the at least one parameter equals or exceeds the threshold value.

In an aspect, the detecting includes in a first stage, detecting the at least one activity based on data machine learning based activity detection algorithm; and in a second stage, detecting a number or repetitions of the detected at least one activity based on a template specific to the detected activity using dynamic time warping.

A system for detecting at least one fitness related activity is provided. The system includes at least one processor and a memory coupled to the at least one processor. The at least one processor is generally configured to obtain data from at least one sensor of a wearable device, wherein the at least one sensor detects the data based on body movements of a user wearing the wearable device; and detect, based on the data, the at least one fitness related activity from a set of fitness related activities, wherein the detection is performed without pre-training by the user of a system configured for the detection.

In an aspect, the at least one processor is configured to detect the at least one activity based on instructions stored in the memory.

In an aspect, the system further includes a server accessible via a network, the server storing instructions related to performing the detection, wherein the at least one processor is configured to detect the at least one activity based on the instructions obtained from the server.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

DETAILED DESCRIPTION

New fitness trackers and smartwatches are released to the consumer market every year. These devices are typically equipped with different sensors, algorithms, and accompanying mobile apps. However, activity trackers are still unable to detect and distinguish between different types of fitness related activities such as squats, lunges, jumping jacks, push-ups etc., without a user manually inputting the type of activity the user desires to track. Additionally, repetition counting for many fitness related activities must also be performed manually by the user (e.g., by tapping a smartphone application button for entry of each repetition), which is tedious and leads to a diminished user experience.

Certain aspects of the present disclosure discuss techniques for automatically detecting and tracking of fitness related activities. The discussed techniques include techniques for detecting at least one fitness related activity from a plurality of fitness related activities based on body movements detected by one or more sensors in a wearable device. The techniques for tracking a fitness related activity includes automatic repetition counting of a detected activity.

Figure 1:
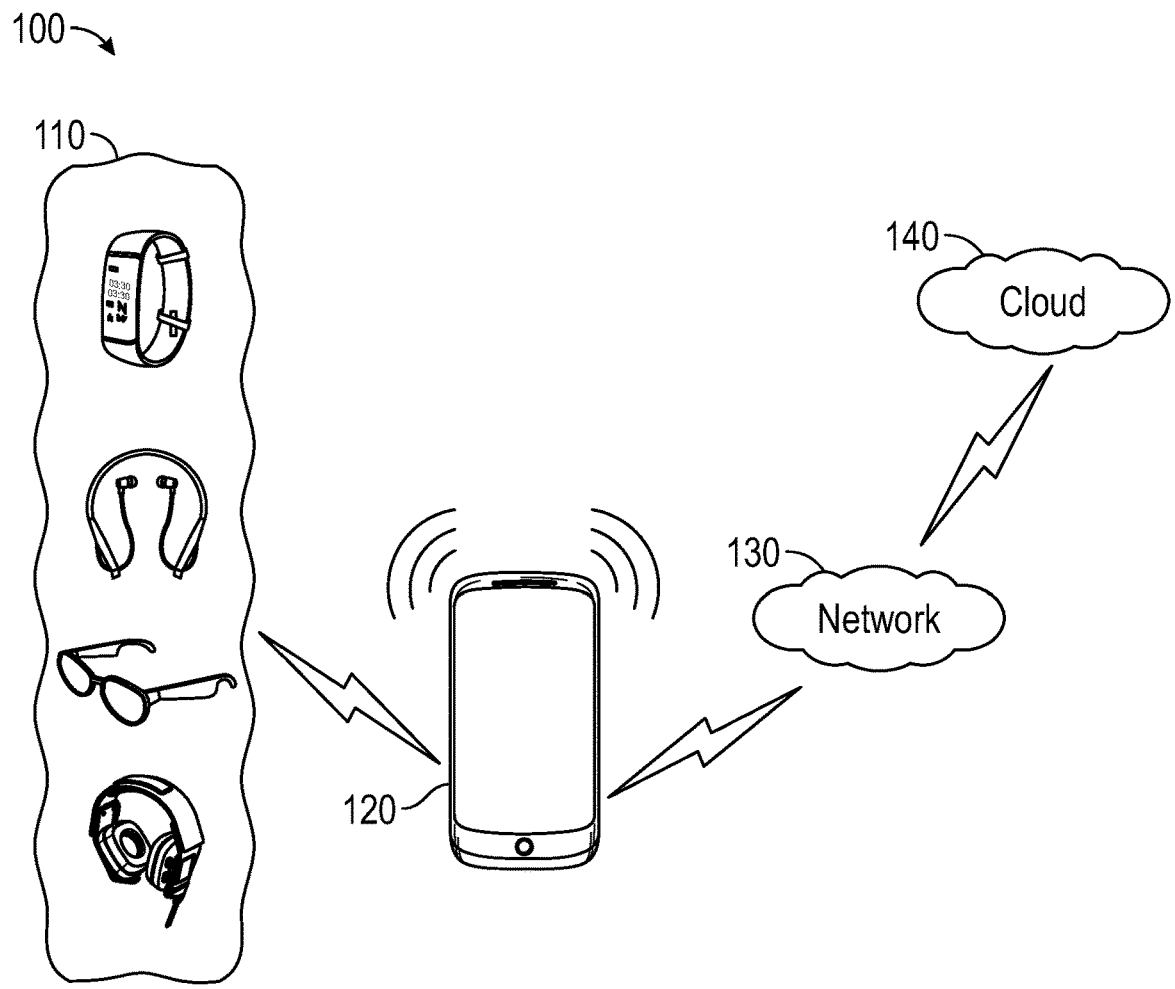
FIG. 1 illustrates an example system in which aspects of the present disclosure may be practiced.

FIG. 1 illustrates an example system 100 in which aspects of the present disclosure may be practiced.

As shown, system 100 includes at least one wearable device 110 communicatively coupled with a portable user device 120. The at least one wearable device 110 may include wearable audio devices such as over-the-ear headphones, audio eyeglasses or frames, in-ear buds, around-ear devices, on-neck devices, or other wearable devices such as smart watches, headbands or the like. In some aspects, the at least one wearable device 110 is configured to be worn in/on at least a portion of a user's head and/or on at least a portion of a user's neck. In an aspect, a wearable audio device can include one or more microphones to detect sound in the vicinity of the audio device. The audio device can further include hardware and circuitry including processor(s)/processing system and memory configured to implement one or more sound management capabilities including, but not limited to, controlling a level of noise cancelling or a level of sound masking based on at least one of user preferences, a loudness of sounds external to the audio device, a state of motion of the user, speech uttered in the vicinity of the audio device, or a geolocation of the audio device. Each audio device also includes at least one acoustic transducer (also known as driver or speaker) for outputting sound. The included acoustic transducer(s) can be configured to transmit audio through air and/or through bone (e.g., via bone conduction, such as through the bones of the skull).

In an aspect, the at least one wearable device 110 is wirelessly connected to the portable user device 102 using one or more wireless communication methods including but not limited to Bluetooth, Wi-Fi, Bluetooth Low Energy (BLE), other radio frequency (RF)-based techniques, or the like. In an aspect, each wearable device 110 includes a transceiver that transmits and receives information via one or more antennae to exchange information with the user device 120. In an aspect, the at least one wearable device 110 includes one or more sensors configured to detect body movements of a user wearing the device 110. For example, each wearable device 110 can include at least one sensor including but not limited to one or more accelerometers, gyroscopes, magnetometers, or a combination thereof.

In an aspect, the at least one wearable device 110 can be connected to the portable user device 120 using a wired connection, with or without a corresponding wireless connection. As shown, the user device 120 can be connected to a network 130 (e.g., the Internet) and can access one or more services over the network. As shown, these services may include one or more cloud services 140.

The portable user device 120 is representative of a variety of computing devices, such as mobile telephone (e.g., smart phone) or a computing tablet. In an aspect, the user device 120 can access a cloud server in the cloud 140 over the network 130 using a mobile web browser or a local software application or "app" executed on the user device 120. In an aspect, the software application or "app" is a local application that is installed and run locally on the user device 120. In an aspect, a cloud server accessible on the cloud 140 includes one or more cloud applications that are run on the cloud server. The cloud application can be accessed and run by the user device 120. For example, the cloud application may generate web pages that are rendered by the mobile web browser on the user device 120. In an aspect, a mobile software application installed on the user device 120 and a cloud application installed on a cloud server, individually or in combination, can be used to implement the techniques for automatically detecting and tracking of fitness related activities in accordance with aspects of the present disclosure.

Figure 2:
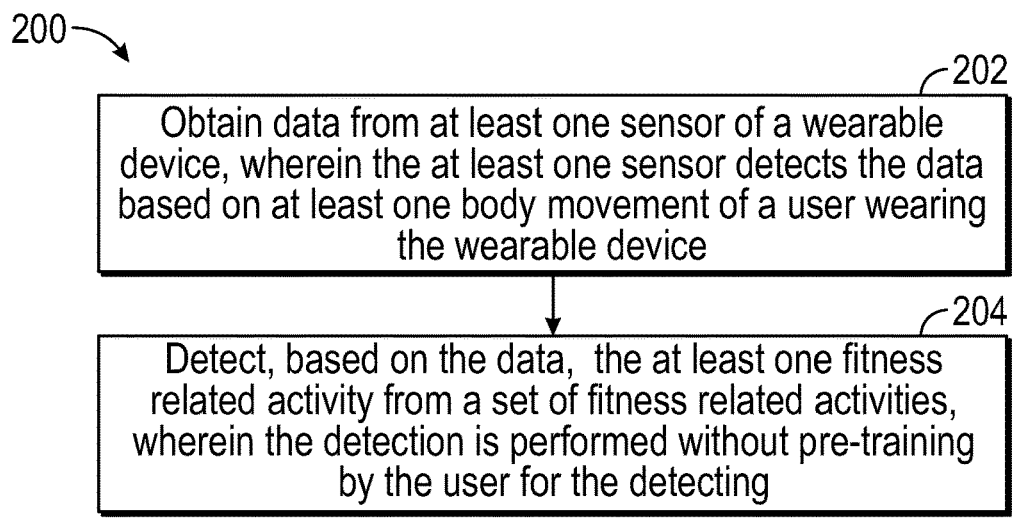
FIG. 2 illustrates example operations for automatically detecting and tracking of fitness related activities in accordance with aspects of the present disclosure.

FIG. 2 illustrates example operations 200 for automatically detecting and tracking fitness related activities in accordance with aspects of the present disclosure.

Operations 200 begin, at 202, by obtaining data from at least one sensor of a wearable device, wherein the at least one sensor detects the data based on at least one body movement of a user wearing the wearable device.

At 204, based on the data, the at least one fitness related activity is detected from a set of fitness related activities, wherein the detection is performed without pre-training by the user for the detecting.

Figure 3:
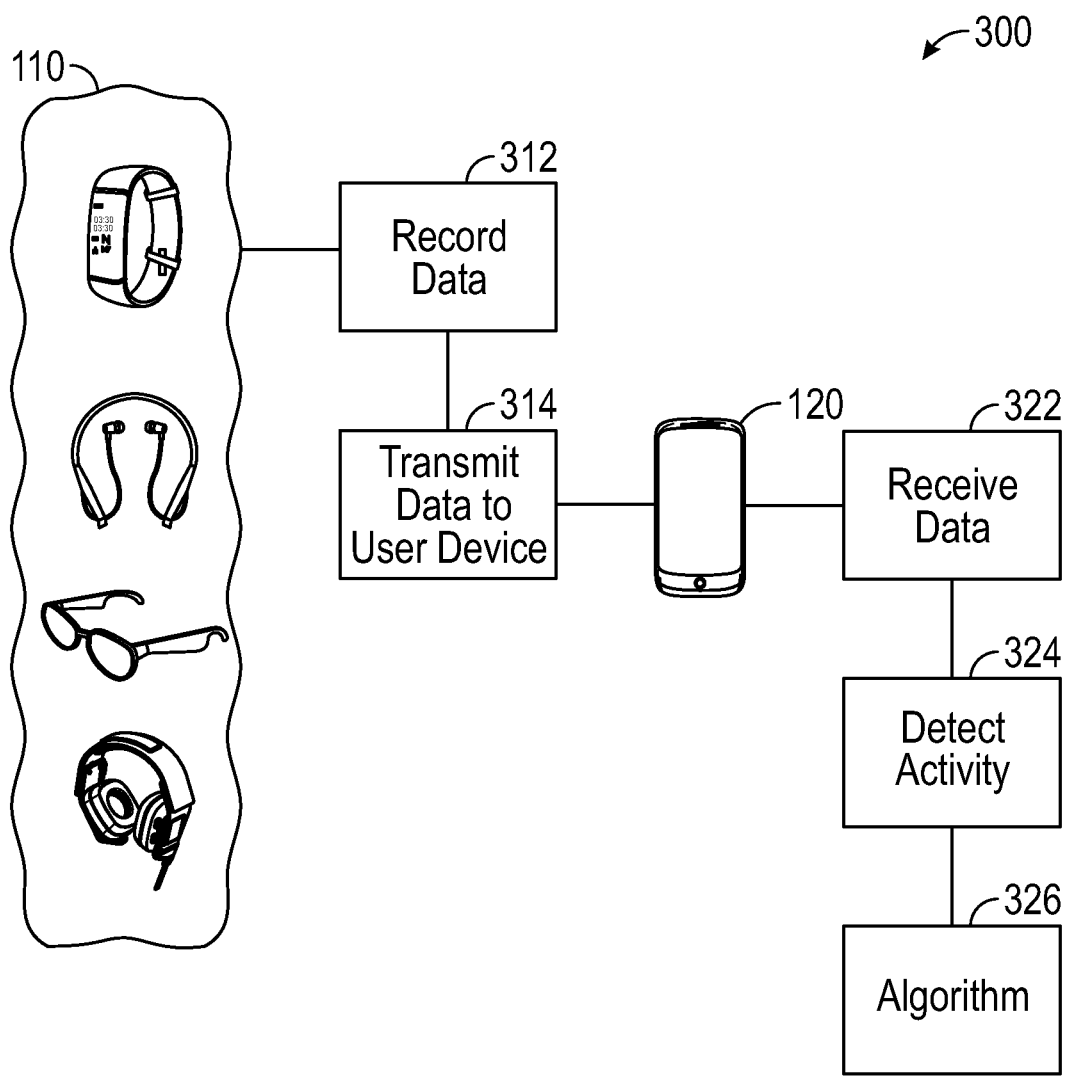
FIG. 3 illustrates operations for automatically detecting and tracking of fitness related activities in accordance with aspects of the present disclosure.

FIG. 3 illustrates operations 300 for automatically detecting and tracking of fitness related activities in accordance with aspects of the present disclosure.

In certain aspects, a user desiring to detect and track a fitness related activity may wear one or more wearable devices 110 configured to facilitate the detection of the desired fitness related activity. In an aspect, each wearable device 110 includes at least one sensor for detecting at least one body movement of the user. For example, a wearable device can include at least one of an accelerometer, a gyroscope, a magnetometer or a combination thereof. In an aspect, a wearable device 110 can include a 9-axis inertial motion unit (IMU) including a 3-axis gyroscope, a 3-axis accelerometer and a 3-axis magnetometer. In an aspect, each of the sensors is configured to detect one or more body movements of the user. In an aspect, the at least one wearable device can include a device on the user's head such as headphones, glasses, earbuds, around-ear device, headband etc., or other wearable devices that can be worn on the user's neck, shoulder(s), arm(s), torso etc. It may be noted that the examples of wearable devices discussed above are non-limiting and sensor data for detection and tracking of fitness related activities can be obtained from any type of currently available wearable devices or wearable devices that may be introduced in the future.

As shown in FIG. 3, at least one wearable device worn by the user to detect a fitness related activity, detects data, at 312, related to at least one body movement of the user as the user is performing a fitness related activity. At 314, the raw data detected by the at least one wearable device 110 is transmitted to the user device 120. In an aspect, the intelligence required for translating the raw sensor data detected by the at least one wearable device 110 into detected fitness related activities can reside on the user device 120, can be native to the wearable device 110, can be in the cloud (e.g., cloud 140 of FIG. 1), or a combination thereof. In an aspect, the user device 120 is configured to detect and track one or more fitness related activities based on data detected by at least one wearable device 110 using at least one algorithm. In an aspect, the user device 120 can use a customized algorithm for detecting and tracking each fitness related activity. In an aspect, the user device 120 can use a single algorithm for detecting and tracking multiple fitness related activities.

As shown in FIG. 3, the user device 120 receives data related to at least one body movement of the user as detected by one or more sensors of the at least one wearable device 110 worn by the user. At 324, the received sensor data is processed by the user device 120 using at least one algorithm 326 to detect and/or track at least one desired fitness related activity. In an aspect, at least a portion of the algorithm 326 resides in the cloud (e.g., cloud 140 of FIG. 1) and the user device 120 can access the algorithm 326 from the cloud and process the algorithm using a cloud server for the detection.

In an aspect, the at least one algorithm 326 discussed herein is designed to detect (without manual input from the user) a type of fitness related activity currently being performed by the user from a plurality of fitness related activities that can potentially be performed by the user, based on at least one body movement of the user as detected by the at least one wearable device 110. For example, the at least one algorithm can detect a fitness related activity from a set of one or more fitness related activities including squats, lunges, jumping jacks, jumping rope, push-ups, lateral jumps, squat jumps, step-ups, around the world planks, skips, or the like. In an aspect, every sensor of the at least one wearable device 110 need not be utilized for detecting a particular fitness related activity. For instance, in an example implementation, a jumping jack can be detected and tracked using the accelerometer sensor only. In another example implementation, a side bend can be detected and tracked using the gyroscope sensor only. In yet another example implementation, a torso twisting activity can be detected and tracked using the magnetometer sensor only. In still another example implementation, where the at least one wearable device 110 includes at least one accelerometer, at least one gyroscope, and at least one magnetometer, a squat can be detected using only the accelerometer(s) and gyroscope(s), without using the magnetometer(s), such that either the magnetometer(s) are disabled (e.g., to reduce overall data and/or to preserve power) or the data from the magnetometer(s) is ignored. In other words, in some implementations, the techniques described herein include purposefully using a fewer number of sensors (or the data therefrom) than the total number available from the at least one wearable device 110 (e.g., to improve detection accuracy and/or speed, to preserve power, and/or for other beneficial purposes). Further, such implementations can help with simultaneously detecting different activities, such as by utilizing different sensors per activity. To provide an illustrative example, jumping jacks, side bends, and torso twists could all be simultaneously detected by using only accelerometer data to detect jumping jacks, only gyroscope data to detect side bends, and only magnetometer data to detect torso twists.

In an aspect, at least some algorithms discussed herein for detecting and tracking of fitness related activities do not require any pre-training by the user for the detection or tracking. In other words, the algorithms can be designed to perform the detection and tracking of activities of a user without the user having to pre-train the algorithms for recognizing user-specific body movements related to particular fitness related activities. In such implementations, determination 204 can be achieved without any pre-training by the user. Note that pre-training, in some aspects, includes having the user perform the activity to be detected one or more times in an attempt to learn the user's body movements for that activity. In implementations that do not require such pre-training, the user can quickly utilize the activity detection and tracking techniques variously described herein without having to spend time teaching the algorithm how to determine those activities. As can be understood, this benefit increases as the number of detectable activities increases.

In an aspect, tracking of a detected fitness related activity includes counting repetitions of the activity. The algorithms discussed herein are designed to automatically count repetitions of a particular detected activity without manual intervention by the user for the repetition counting. For example, if the user performs multiple jumping jacks the algorithm can automatically detect each jumping jack and can automatically count a number of repetitions. In an aspect, tracking relates to how the activity is performed, such as the accuracy or form or propriety of the activity, speed, intensity, consistency, and/or other metrics that can be determined using detected sensor data obtained 202 from the at least one wearable device 110. In such an aspect, the algorithm could first determine what activity is being performed prior to determining other metrics, such that those metrics can be measured appropriately for the particular activity.

In certain aspects, all of the tracked data could be stored locally at the at least one wearable device 110, at the user device 120, and/or in the cloud 140 for a user to keep a history of workout data.

In an aspect, the user device 120 provides a software application (e.g., a mobile app) and a corresponding user interface from which the user can create and customize fitness routines. For example, using the software application, the user can pre-program a fitness routine including a set of activities, a sequence of activities, and a corresponding number of repetitions for each activity that the user desires to perform for the fitness routine. In an aspect, the software application via the application's user interface provides a list of fitness related activities and the user can select one or more activities from the list to program a fitness routine. In an aspect, the user can program multiple fitness routines, each routine including different combinations, different sequences, and/or different repetitions of fitness related activities. The user can launch a pre-programed fitness routine from the software application to initiate detecting and tracking of the fitness related activities based on the pre-programmed fitness routine. In an aspect, the user can also select individual fitness activities, set corresponding repetitions, and launch the individual activities using the software application. In an aspect, the selection of fitness related activities, setting of repetitions, and/or launching of pre-programmed fitness routines can be performed by the user manually, such as via the user device (e.g., using the user interface of the software application or voice input) or by using the wearable device (e.g., manual input using control feature(s) or voice input), and/or it could be performed automatically, such as by another user (e.g., by a training coach or partner) or as a pre-loaded routine (e.g., based on one or more factors such as user profile data, previous selections, time of day, location, specific wearable device(s) being utilized, etc.).

In certain aspects, the user selection of specific activities (e.g., individual activities or pre-programmed activities by selection of a fitness routine) prior to performing the selected activities can have several advantages. In an aspect, as the system, based on the user selection, knows which activities are expected to be performed by the user, in what sequence, and how many repetitions for each activity, customized algorithms can be used for detecting and tracking of each expected activity and the processing resources and all or most of collected sensor data can be focused at detecting and tracking a single expected activity at one time. This can significantly increase the speed of detection and tracking (e.g., repetition counting) of the activity and reduce detection errors. Additionally or alternatively, in order to save power of a wearable device (e.g., wearable device 110), based on the activities programmed for a particular fitness routine, at any time only those sensors of the wearable device can be turned on that are to be used for tracking a particular activity of the routine expected to be performed at that time.

In contrast, without user selection of one or more activities (and sequence thereof) prior to the user performing activities, the system (e.g., system 100 of FIG. 1) will have to check for multiple activities at the same time in order to detect the activity being performed by the user. For example, the system may need to run several algorithms (each algorithm designed for detecting one or more activities) to check for multiple possible activities based on the data obtained by the sensors. This may require longer and more complicated processing and can lead to longer detection delays and/or higher power consumption. Additionally or alternatively, if there are two or more activities that could be performed, there could be an increase in detection error, as multiple movements will be attempted to be identified using the same sensed data. For example, if a user is performing a set of all different movements (e.g., squats, lunges, and jumping jacks) in a random order, the algorithm will be looking for all three of those movements. Thus, there could be differences in how a given activity is detected based on whether it is the only activity the algorithm is looking for, or whether there are other activities also trying to be identified. For instance, if the algorithm is only attempting to detect the given activity, data from all wearable device sensors could be utilized, but if the algorithm is attempting to detect multiple different activities, a subset of those sensors could be utilized (e.g., as previously discussed with respect to jumping jacks, side bends, and torso twists). In an aspect, when multiple activities are being attempted to be detected, the accuracy of activity detection and/or efficiency of detection can be based on the particular activities. For example, squats and lunges may have a high overlap in body movements and corresponding sensed data, and thus can lead to higher detection errors. On the other hand, squats and jumping jacks have little overlap in body movements, and thus, can have lower detection errors.

In certain aspects, system 100 can provide activity detection and/or tracking feedback in a visual, audial, and/or tactile manner. Further, such feedback could be provided from the at least one wearable device 110 and/or a paired user device 120. For instance, the user software application (e.g., mobile application installed on the user device 120) can provide visual feedback of the activity detection and/or tracking to the user via the user interface of the software application. Additionally or alternatively, audio feedback of the activity detection and/or tracking can be provided to the user, for example, using an audio wearable device (e.g., audio headphones). It may be noted that the audio wearable device used for providing audio feedback to the user may or may not be used for collecting sensor data related to body movements of the user. That is, different wearable device(s) can be used for detecting sensor data and for providing audio feedback to the user.

In certain aspects, the audio/video/tactile feedback provided to the user could be basic, such as indicating the number of repetitions completed for a particular activity and/or indicating when a total number of desired repetitions have been completed for the activity. In an aspect, the feedback could also be more advanced. For example, the feedback could provide data/statistics, such as relating to a form/posture being used for the activity (e.g., squats where the user is leaning too far forward or looking down too far), relating to previous personal performance (e.g., relative to how fast the user previously performed a set of repetitions for an activity, or informing how many repetitions were previously performed for the activity), and/or comparative performance data (e.g., comparing to other users' performance data stored in a database, or comparing data live in a competition format, such as during national CrossFit® competitions). In an aspect, the feedback could also be motivation-based, such as providing audio encouragement if the user is pausing for a predetermined time between repetitions or as the user nears the end of the desired total of repetitions.

In certain aspects, at least some activity detection and/or tracking algorithms could be improved by customization over time by learning the user's motions. For example, if the user is performing squats and only squats down a minimal amount for the motion (e.g., if the user has bad knees), then such behavior could be learned to cause an increase in sensitivity of the detection (e.g., as opposed to a user who performs relatively deeper squats). In some aspects, the activity detection and/or tracking algorithms could be improved using personal information of the user, such as height, weight, gender, age, body type, etc.

In certain aspects, the system (e.g., system 100 of FIG. 1) could additionally or alternatively track other metrics, such as a duration of at least one body movement related to a particular activity, an extent of the at least one body movement related to the activity, or intensity of performing the at least one activity. In an aspect, the same set of sensors (e.g., 9-axis IMU sensor) used for detecting activities and counting repetitions of the activities may be leveraged for tracking these additional metrics.

In certain aspects, one or more additional sensors could be used to supplement the data collected by sensors discussed above used for detection and tracking of fitness related activities. For example, data from heart rate sensors can be used to track heart rate during activities. In such an example, the heart rate data could be used to make dynamic changes (e.g., to the fitness routine), such as changing the number of expected repetitions during a set or changing the expected duration until the set is complete.

Figure 4:
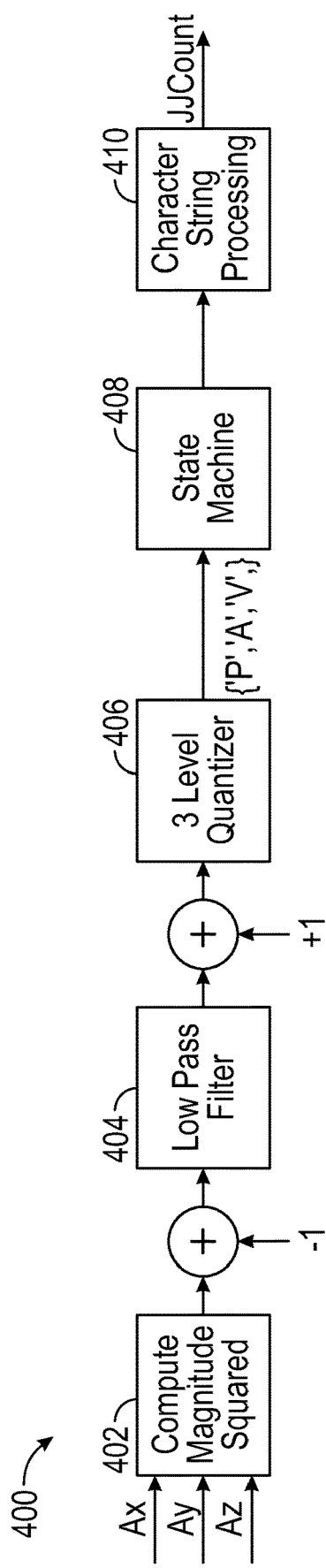
FIG. 4 illustrates a block diagram of an example algorithm for automatically detecting a jumping jack activity, in accordance with certain aspects of the present disclosure.

FIG. 4 illustrates a block diagram 400 of an example algorithm for automatically detecting a jumping jack, in accordance with certain aspects of the present disclosure. This example algorithm uses input from an accelerometer sensor (e.g., 3-axis accelerometer sensor of a 9-axis IMU sensor) to detect a jumping jack. As shown in FIG. 4, the block diagram 400 accepts component inputs Ax, Ay and Az from an accelerometer sensor. In an aspect, this example algorithm is designed to automatically detect a jumping jack without any pre-training by the user for performing the detection.

A jumping jack generally includes two moments where the exercise subject is airborne in free fall, one as the legs are diverging and one as the legs are converging. At the moments of free fall, the accelerometer sensor measures an acceleration of approximately zero. The kick off movement of a jumping jack which causes the subject to leave the ground causes the accelerometer to read a relatively large magnitude signal. Likewise, the landing movement also causes a large magnitude signal.

As shown, a magnitude square is computed at 402 of component inputs from the accelerometer sensor. The resulting magnitude squared signal is passed through a low pass filter at 404. The amplitude of the low pass filtered magnitude squared signal of the acceleration is then quantized at 406 into 3 bins, namely Peak ('P'), Ambiguous ('A'), and Valley ('V'). The Peak corresponds to the kick off and landing regions and the Valley corresponds to a free fall region. At 408, a state machine cleans up the quantized signal by applying information about expected durations and (among other things) converts long strings of 'P' to a single 'P' and long strings of 'V' to a single 'V'. At 410, a sliding window of 3 characters is inspected for the sequence "PVP". Each time this occurs the valley count is incremented. Every two valley counts increment the jumping jack count (JJ-Count). In an aspect, it may happen that the exercise subject is doing the jumping jacks as isolated events, separated in time, or as a continuous sequence. During the time between exercise repetitions, the quantizer 406 will mostly output character 'A' representing an ambiguous region. The state machine 408 converts a sufficiently long sequence of mostly 'A' to one or more 'A' output characters so that the 'PVP' recognizer does not fire. This basically allows the algorithm to 'forget' one of the 'P' characters. In an aspect, as shown, filtering one minus the magnitude (squared) (before the low pass filter stage 404) and then adding one back (before the low pass filter stage 404) results in a much smaller start up transient.

Figure 5:
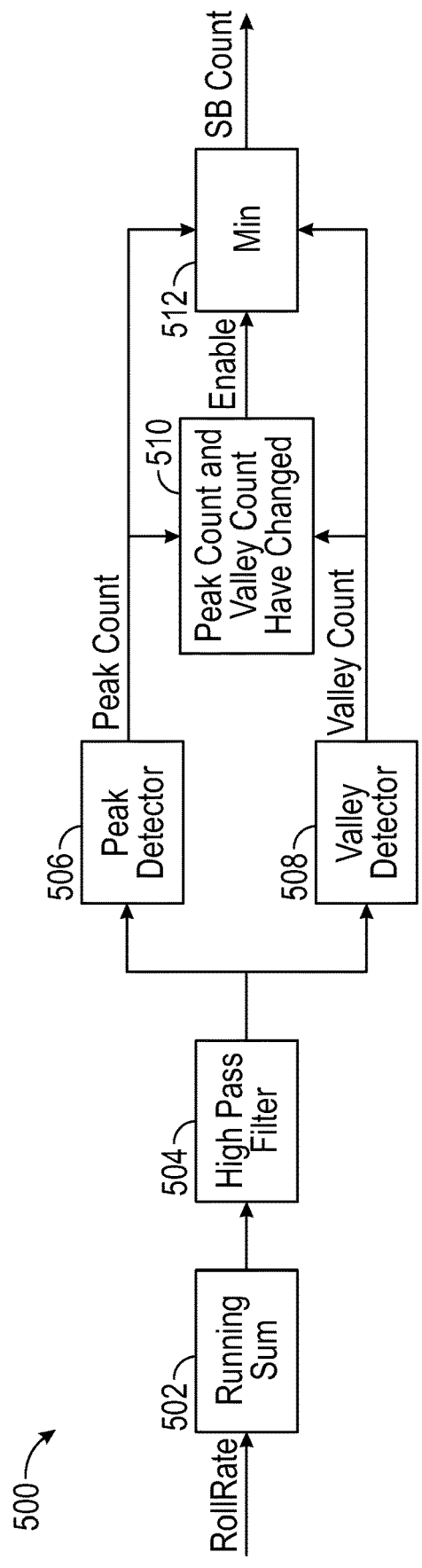
FIG. 5 illustrates a block diagram of an example algorithm for automatically detecting a side bend activity, in accordance with certain aspects of the present disclosure.

FIG. 5 illustrates a block diagram 500 of an example algorithm for automatically detecting a side bend, in accordance with certain aspects of the present disclosure. This example algorithm uses input from a gyroscope sensor (e.g., 3-axis gyroscope sensor of a 9-axis IMU sensor) to detect a side bend. As shown in FIG. 5, the block diagram 500 accepts a gyroscope roll rate input from a gyroscope sensor. In an aspect, this example algorithm is designed to automatically detect a side bend without any pre-training by the user for performing the detection.

A side bend is considered to be a bend starting from a vertical body position to the right (or left) from the waist followed by a return to the vertical position, followed immediately and continuously by a bend to the left (or right) and a subsequent return to the vertical position. This motion results in the roll gyroscope producing an oscillatory signal with approximately zero mean. This signal has units of angle per unit time, that is, it is a rate. At 502, the signal is converted to an angle signal by computing a running sum (which is an approximation for a time integral). The resulting signal is passed through a high pass filter at 504 to compensate for various (e.g., IMU hardware and other) errors which can cause the mean to be not precisely zero. Peak and valley (negative peak) detectors are applied at 506 and 508 respectively. In an aspect, the detectors at 506 and 508 include various techniques to prevent false detection of peaks and valleys. For example, a minimum threshold is employed so that very small peaks (and valleys) are not detected. Further, a memory signal is formed to prevent the detectors from detecting more than one peak (or valley) very close to another. This could happen if the exercise subject does not move in a steady manner or moves his or her head in certain ways during the exercise. At 510, the algorithm detects, based on the peak and valley detection in the previous stages, whether the peak count and/or the valley count has changed. In response to detecting a change in the peak count and/or the valley count, the minimum of the peak and the valley counts is output as the side bend count at 512. Ideally the peak and the valley counts would be equal and generally they are. However, as over-counting errors are more common than undercounting errors, especially between isolated repetitions, selecting the minimum of the two counts results in a more accurate count. In general, one or more error mitigation techniques can be implemented by the algorithms variously described herein to improve accuracy.

Figure 6:
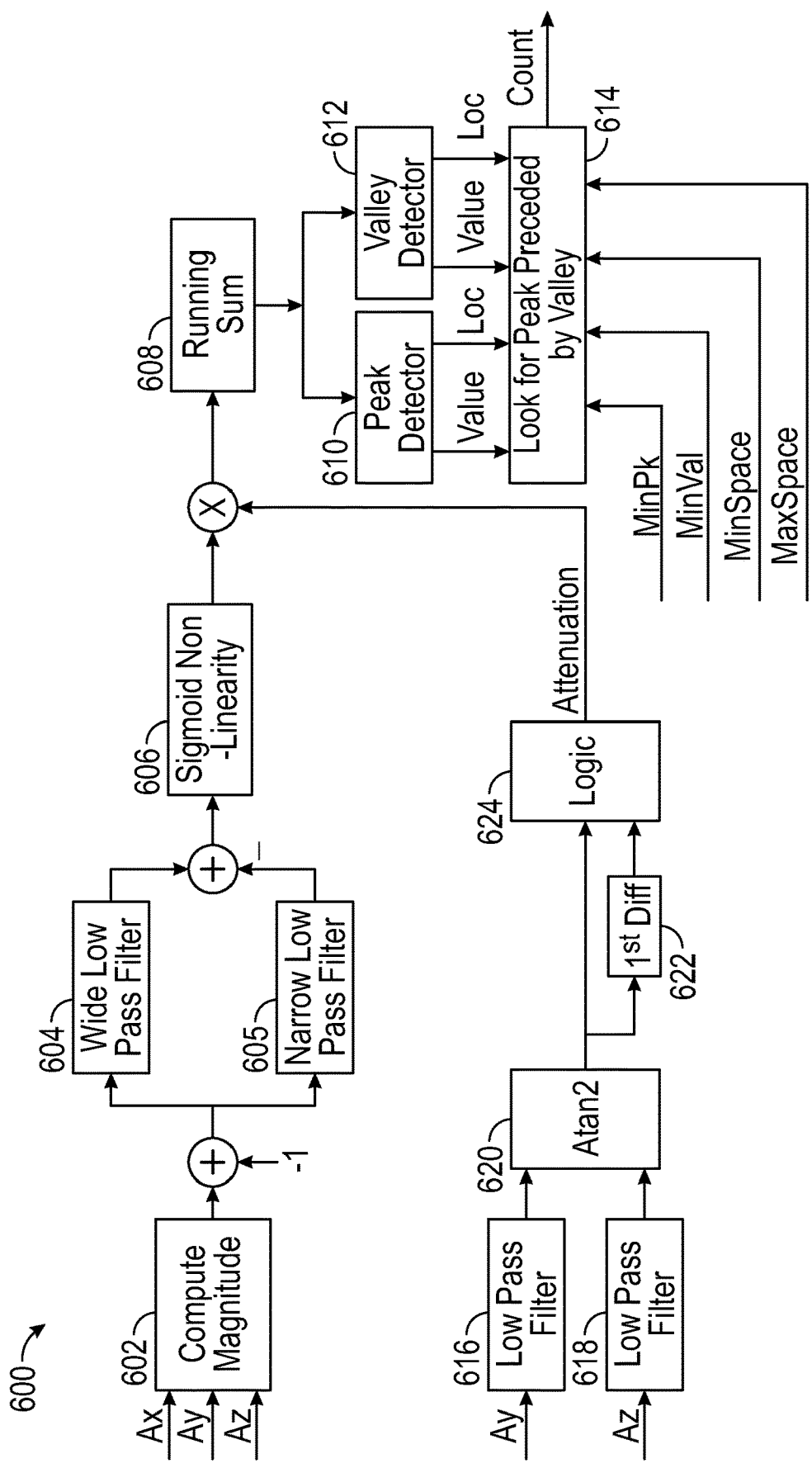
FIG. 6 illustrates a block diagram of an example algorithm for automatically detecting a push-up activity, in accordance with certain aspects of the present disclosure.

FIG. 6 illustrates a block diagram 600 of an example algorithm for automatically detecting a push-up, in accordance with certain aspects of the present disclosure. This example algorithm uses input from an accelerometer sensor (e.g., 3-axis accelerometer sensor of a 9-axis IMU sensor) to detect a push-up. As shown in FIG. 6, the block diagram 600 accepts component inputs Ax, Ay and Az from an accelerometer sensor. In an aspect, this example algorithm is designed to automatically detect a push-up without any pre-training by the user for performing the detection.

A push up consists of lowering the body from a plank position to an almost horizontal position and then returning to the plank position. In the case of isolated repetitions, it is assumed that the resting position is in the plank position. In an aspect, the plank position is when the body is stretched out, weight is on the toes, and the arms are extended with weight on the hands. An acceptable variant allows the weight to be supported on the knees instead of the toes. This variant is easier to perform. Another variant allows the resting position to be horizontal. The algorithm needs to either be told which resting position is being used or can infer it with some loss of performance. Block diagram 600 and the following description describe only the resting up variant. To convert the algorithm for the other resting position, the logic block "Look for Peak Preceded by Valley" at 614 would become "Look for Valley Preceded by Peak" and the parameters controlling that block would change. The main signal of interest is the magnitude of the acceleration shown as input components Ax, Ay and Az. In an aspect, this is a good choice because it is largely independent of head position variations allowed by the neck joint and hip joint as well as the head position variation caused by the push up motion itself. As shown, a magnitude of the input signal is computed at 602. The magnitude signal is filtered (at 604 and 605) and a running sum is formed at 606 of the resulting signal. In an aspect, since people do push-ups at highly variable rates the running sum is normalized by processing the filter output with a sigmoid function at 606 (like the one often used in neural networks) before using it in the running sum at 608. Peak and valley (negative peak) detectors are applied at 610 and 612 respectively. Block 614 detects if a peak is preceded by valley and a count is output if the peak is preceded by a valley.

In an aspect, an attempt to reduce the false counting caused by simply nodding the head instead of doing a push-up (and also motions associated with getting into and leaving the floor at the start and end of the exercise session) is made by applying an attenuation to the output of the sigmoid function based on both the magnitude and the rate of change of the IMU angle with respect to the horizontal. As shown, this angle is inferred from the ratio of the low pass filtered Az and Ay acceleration components. The sign of the Az component can be either positive or negative but it is very unlikely for the sign of the Ay component to change. Accordingly, Ay is put in the denominator instead of Az to avoid division by zero.

Figure 7A:
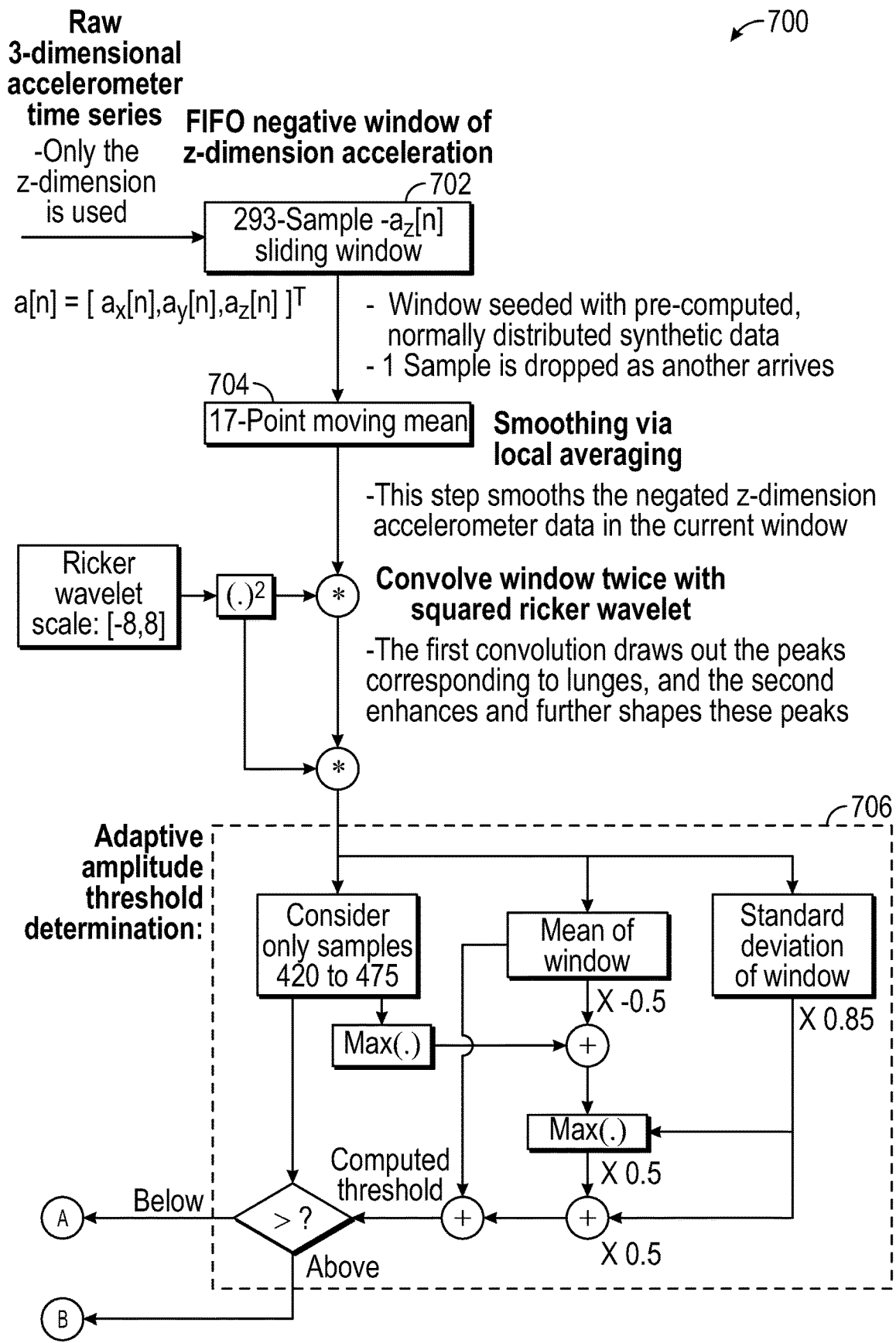
FIGS. 7A and 7B illustrate a block diagram 700 for detecting and counting lunges, in accordance with certain aspects, of the present disclosure.
Figure 7B:
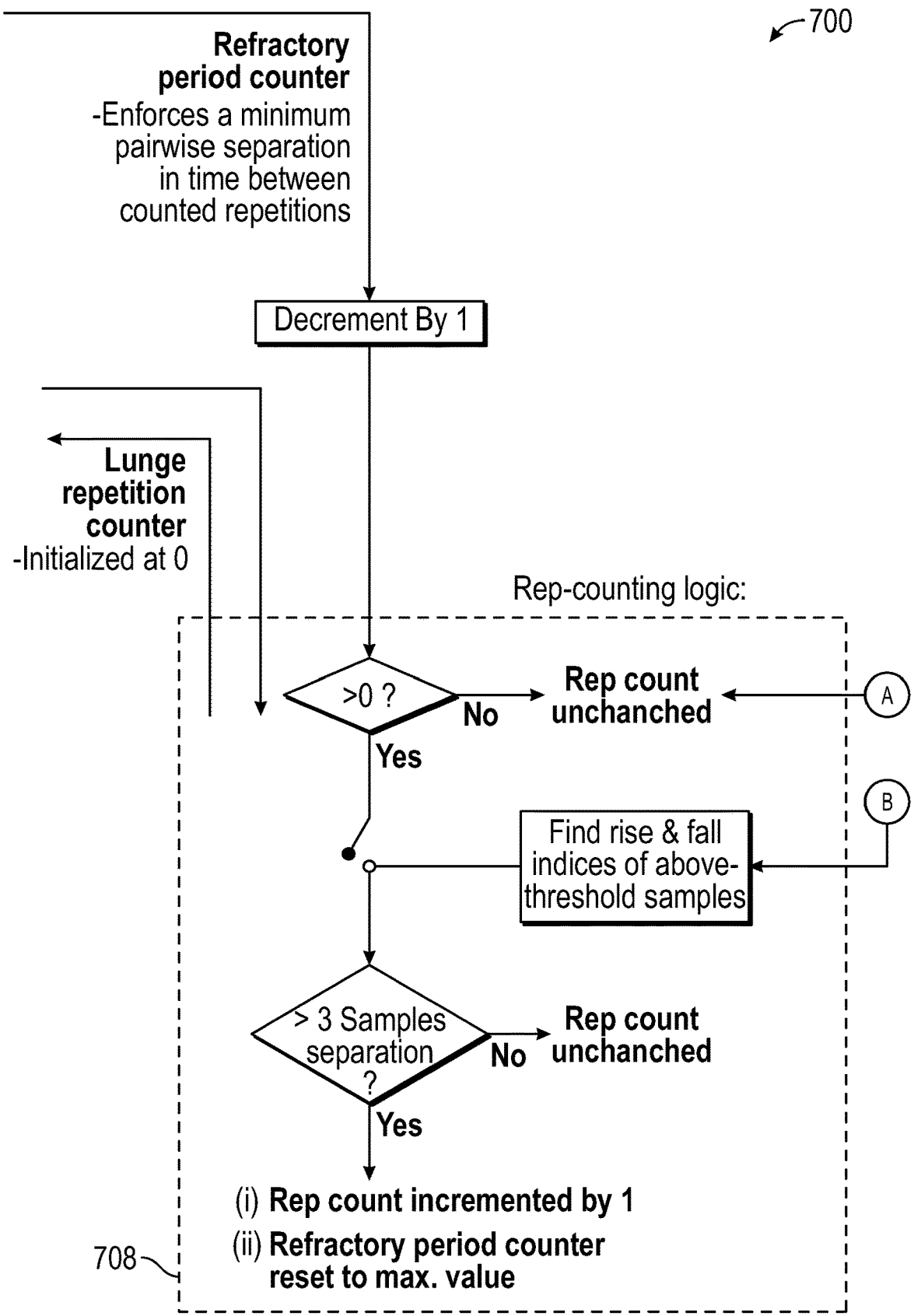

FIGS. 7A and 7B illustrate a block diagram 700 for detecting and counting lunges, in accordance with certain aspects, of the present disclosure. In certain aspects, lunges can detected according to a sliding-window-based algorithm. A lunge repetition counter is initialized to 0 repetitions. As shown in FIG. 7A, at 702, a first-in, first-out (FIFO) window buffer is seeded with normally distributed synthetic accelerometer data which has mean and variance similar to the IMU at rest, subject to the force of gravity. This measure circumvents transient effects at the start of the algorithm's execution. As samples arrive from the IMU at each clock cycle, the last sample in FIFO buffer is dropped, and all remaining samples are shifted to make room for the most recent sample.

As shown, at each clock cycle, a flow of computations are applied to the window of data. As shown the flow of computations start at 704, where the data is first smoothed using a sliding mean and then twice convolved with the squared Ricker wavelet having scale defined over real numbers ranging from −8 to +8. The filtered data is then thresholded at 706 according to an adaptive thresholding scheme. The beginning and ending indices of those samples exceeding this clock cycle's threshold are compared and, if they are sufficiently separated in time, the repetition count is incremented by 1 as shown in the repetition logic block 708 in FIG. 7B. When the repetition count is incremented, a separate refractory period counter variable is reset to its maximum value of 75. This counter counts downward from this maximum value and enforces a minimum separation in time between consecutive repetitions. At the end of this 75-sample refractory period (i.e., when the counter is decremented 75 times until reaching zero), a new lunge repetition may once again be detected via adaptive thresholding.

To compute a given clock cycle's unique detection threshold value, the mean and standard deviation of the filtered window data are first computed and scaled. Focus is then restricted to samples 420 to 475 in the filtered window data. Half the original window's mean is subtracted from the maximum value occurring in this narrower window. To determine the current clock cycle's detection threshold, the larger of this computed difference and of the scaled full-frame standard deviation is then added to half of the full window's mean. When samples in the narrowed window of data exceed this computed threshold, the algorithm then executes additional logic to determine whether to increment the repetition count, as detailed in FIG. 7.

In certain aspects, a two-stage algorithm may be used for activity detection and repetition counting. The two-stage algorithm can include a machine-learning based activity detector followed by a template-based repetition counter. The first stage uses a classification tree algorithm trained on frame features from IMU data (accelerometer and gyroscope) from multiple study participants performing sequences of one to five repetitions of a particular activity. IMU data frames during which activities take place are annotated as a positive or detection class, while other frames, which may include edge cases no-rep activities, are labeled as a negative or non-detection class. Once trained, the activity detector assigns a label of "activity" or "non-activity" to a stream of IMU (accelerometer or gyroscope) samples using a detector specific to each activity. IMU samples along a single dimension (a primary IMU axis or combination or axes) during sample times identified as "activity" are then placed into a buffer and compared to a template (specific to each activity) using dynamic time warping (DTW). In an aspect, a repetition is identified and a repetition counter is incremented if the distance metric obtained as result of the comparison is below a distance threshold. In an aspect, the distance threshold is determined empirically from the same data set used to train the first stage algorithm. In an aspect, the two-stage algorithm can be used to detect multiple activities. In an aspect, activities may differ in activity detection features, frame sizes, or DTW parameters (IMU principle axis, rep distance and template), but the architecture of the algorithm is otherwise identical. In an aspect, such techniques could be used as a learning mode to customize the algorithm to the specific user, thereby potentially improving activity detection and/or tracking.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method for detecting at least one fitness related activity, comprising:
   obtaining data from at least one sensor of a wearable device, wherein the at least one sensor detects the data based on at least one body movement of a user wearing the wearable device; and
   detecting, based on the data, the at least one fitness related activity from a set of fitness related activities and number of repetitions, wherein the detection is performed without pre-training by the user for the detecting, wherein the detecting comprises:
   in a first stage, detecting the at least one fitness related activity based on a machine learning based activity detection algorithm; and
   in a second stage, detecting the number of repetitions of the detected at least one fitness related activity based on a template specific to the detected fitness related activity using dynamic time warping.

2. The method of claim 1, further comprising:
   determining, based on the data, at least one characteristic related to the detected at least one fitness related activity.

3. The method of claim 2, wherein the at least one characteristic comprises a number of repetitions of the detected at least one fitness related activity over a given time period.

4. The method of claim 2, wherein the at least one characteristic comprises at least one of a duration of the at least one body movement related to the at least one fitness related activity, an extent of the at least one body movement related to the at least one fitness related activity, or intensity of performing the at least one fitness related activity.

5. The method of claim 1, further comprising:
   obtaining a selection by the user of the at least one fitness related activity from the set, wherein the detecting comprises attempting to detect, based on the data, the selected at least one fitness related activity.

6. The method of claim 5, further comprising:
   obtaining a desired number of repetitions of the selected at least one fitness related activity;
   determining, upon detecting the selected at least one fitness related activity, a number of repetitions related to the selected at least one fitness related activity in a given time period; and
   generating an indication when the number of repetitions is same as the desired number of repetitions.

7. The method of claim 1, further comprising:
   determining, based on the data, at least one pattern of the at least one body movement by the user associated with the detected at least one fitness related activity; and
   adjusting sensitivity of the at least one sensor based on the determined pattern.

8. The method of claim 1, wherein the detection of the at least one fitness related activity comprises:
   obtaining a threshold value of at least one parameter included in the data; and
   deciding that the at least one fitness related activity is detected when the at least one parameter equals or exceeds the threshold value.

9. The method of claim 1, further comprising:
   obtaining additional data from at least another sensor of at least another wearable device worn by the user, wherein the detecting is further based on the additional data.

10. The method of claim 1, wherein the set of fitness related activities comprises at least one of squats, lunges, jumping jacks, jumping rope, push-ups, lateral jumps, squat jumps, step-ups, around the world plank, or skips.

11. The method of claim 1, further comprising:
    determining, based on the data, an accuracy of performing the detected at least one fitness related activity including at least one of a form, speed, intensity or consistency related to the performed at least one fitness related activity.

12. The method of claim 1, wherein the at least one sensor comprises an inertial motion unit (IMU), and in the second stage, detecting the number of repetitions comprises:
    comparing collected signals from the IMU to the template specific to the detected fitness related activity using dynamic time warping.

13. A non-transitory computer-readable medium for detecting at least one fitness related activity, the computer-readable medium storing instructions which when processed by at least one processor perform a method comprising:
    obtaining data from at least one sensor of a wearable device, wherein the at least one sensor detects the data based on at least one body movement of a user wearing the wearable device; and
    detecting, based on the data, the at least one fitness related activity from a set of fitness related activities and a number of repetitions, wherein the detection is performed without pre-training by the user for the detecting, wherein the detecting comprises:
        in a first stage, detecting the at least one fitness related activity based on a machine learning based activity detection algorithm; and
        in a second stage, detecting the number of repetitions of the detected at least one fitness related activity based on a template specific to the detected fitness related activity using dynamic time warping.

14. The computer-readable medium of claim 13, further comprising instructions for:
    determining, based on the data, at least one characteristic related to the detected at least one fitness related activity.

15. The computer-readable medium of claim 14, wherein the at least one characteristic comprises a number of repetitions of the detected at least one fitness related activity over a given time period.

16. The computer-readable medium of claim 13, further comprising instructions for:
    obtaining a selection by the user of the at least one fitness related activity from the set, wherein the detecting comprises attempting to detect, based on the data, the selected at least one fitness related activity.

17. The computer-readable medium of claim 16, further comprising instructions for:
    obtaining a desired number of repetitions of the selected at least one fitness related activity;
    determining, upon detecting the selected at least one fitness related activity, a number of repetitions related to the selected at least one fitness related activity in a given time period; and
    generating an indication when the number of repetitions is same as the desired number of repetitions.

18. The computer-readable medium of claim 13, further comprising instructions for:
    determining, based on the data, at least one pattern of the at least one body movement by the user associated with the detected at least one fitness related activity; and
    adjusting sensitivity of the at least one sensor based on the determined pattern.

19. The computer-readable medium of claim 13, wherein the detecting the at least one fitness related activity comprises:
    obtaining a threshold value of at least one parameter included in the data; and
    deciding that the at least one fitness related activity is detected when the at least one parameter equals or exceeds the threshold value.

20. A system for detecting at least one fitness related activity, comprising:
    at least one processor configured to:
        obtain data from at least one sensor of a wearable device, wherein the at least one sensor detects the data based on body movements of a user wearing the wearable device; and
        detect, based on the data, the at least one fitness related activity from a set of fitness related activities and a number of repetitions, wherein the detection is performed without pre-training by the user of a system configured for the detection, wherein the at least one processor is configured to detect by:
            in a first stage, detect the at least one fitness related activity based on a machine learning based activity detection algorithm; and
            in a second stage, detect the number of repetitions of the detected at least one fitness related activity based on a template specific to the detected fitness related activity using dynamic time warping; and
    a memory coupled to the at least one processor.

21. The system of claim 20, wherein the at least one processor is configured to detect the at least one fitness related activity based on instructions stored in the memory.

22. The system of claim 20, further comprising a server accessible via a network, the server storing instruction related to performing the detection, wherein the at least one processor is configured to detect the at least one fitness related activity based on the instructions obtained from the server.

\* \* \* \* \*